[11] 3,609,288

| [72] | Inventor | Albert M. Sciaky |
| | | Palos Park, Ill. |
| [21] | Appl. No. | 784,574 |
| [22] | Filed | Dec. 18, 1968 |
| [45] | Patented | Sept. 28, 1971 |
| [73] | Assignee | Welding Research, Inc. |
| | | Chicago, Ill. |

[54] ELECTRON BEAM SEAM-FINDING METHOD AND APPARATUS
9 Claims, 4 Drawing Figs.

[52] U.S. Cl..................................................219/121 EM, 219/124
[51] Int. Cl.................................................. B23k 15/00
[50] Field of Search............................................ 219/121, 121 EM; 250/49.5

[56] References Cited
UNITED STATES PATENTS
3,426,174   2/1969   Graham et al. .............. 219/121

Primary Examiner—J. V. Truhe
Assistant Examiner—Robert E. O'Neill
Attorney—Julius L. Solomon ABSTRACT: The present invention is for a method for determining the point of impingement of an electron beam with reference to the position of the seam between the two parts which are to be welded as may be used in the electron beam welding process. The electron beam is oscillated along a line transverse to the seam or along any other convenient path which traverses the seam. Secondary electrons emitted from the surface of the workpieces being scanned by the oscillating beam are collected by an electrode mounted above the work surface. The changes in secondary electron current through the electrode are displayed on the face of the cathode-ray oscilloscope whose horizontal sweep is controlled by the oscillator which is generating the electron beam scanning waveform. The signal generator or oscillator which produces the scanning signal is periodically shorted for preset intervals so that the beam remains in its "at rest" position during these intervals and the horizontal sweep is also "at rest" during these intervals so that a bright marker spot is displayed on the cathode-ray oscilloscope which defines the rest position of the electron beam as it strikes the work. By moving the workpieces with respect to the electron beam in a direction transverse to the seam, this marker spot may be brought to superimpose over the pattern of secondary emission current at a point which indicates the minimum secondary emission. This is the point at which the beam is striking the workpieces at the seam.

INVENTOR
ALBERT M. SCIAKY

ELECTRON BEAM SEAM-FINDING METHOD AND APPARATUS

This invention relates to a method and apparatus which are useful in the electron beam welding process as a method of accurately locating, tracking and aligning the electron beam over the seam between the two parts to be welded. The present invention is an improved method for accurately positioning and tracking the electron beam with respect to the work to be welded prior to welding the materials over that of the method described in U.S. Pat. No. 3,112,391 issued to David Sciaky. In the past the beam has also been located with respect to the workpiece either by a trial-and-error method, for example, allowing the beam to impinge upon the work for a short period of time and observing the position and then moving the work so that the seam was moved towards the beam, or through the use of optical systems which include a crosshair reference of beam impingement on the work position. In the optical method the beam is turned on for a short period of time, the point of impingement is observed through an optical system and crosshairs on the optical system are made to coincide with the place of impingement. The work is then moved so that the spot at which the welding is desired to be started is directly under the crossed hair lines.

The trial and error method is, of course, inaccurate and time consuming and the optical method is not completely satisfactory because of the fact that the optical parts, being within the electron beam welding chamber, are soon coated with the metallic vapors produced during the electron beam welding process. In order to avoid this trouble the reflecting surfaces must be covered by shields during the welding operation to keep the metal from depositing upon these highly polished surfaces. Another difficulty is due to the fact that the parts must be illuminated. With parts having a low reflection factor it becomes difficult to view the parts through the optical system because of the low light levels.

An object of this invention is, therefore, to provide a method for locating the seam with respect to the beam which overcomes the difficulties inherent in the optical method.

Another object of the invention is to provide a means by which the beam may be steered so that it follows the seam.

Another object is to provide a method which does not rely upon visible radiation.

Another object is to provide a method by which the displacement of the point of impingement of the electron beam with respect to the seam may be accurately determined.

Another object of this invention is to provide a means and a method whereby the position of the electron beam with respect to the seam to be welded may be displayed on a cathode-ray oscilloscope of a recording oscillograph.

Another object is to provide a method by which a recording may be made of the path of the electron beam with respect to the seam to be welded as the beam is moved along the seam.

Further objects, features and advantages of the method will be apparent from the following description of the method and of the apparatus taken in connection with the accompanying drawings in which:

FIG. 4a illustrates a circuit arrangement which may be utilized in conjunction with a triangular wave generator to practice the invention.

FIG. 4b illustrates the waveform across the terminals 25 and 26 of FIG. 4a when a periodic triangular waveform is generated across terminals 22 and 23 of the signal generator.

Figure 1:
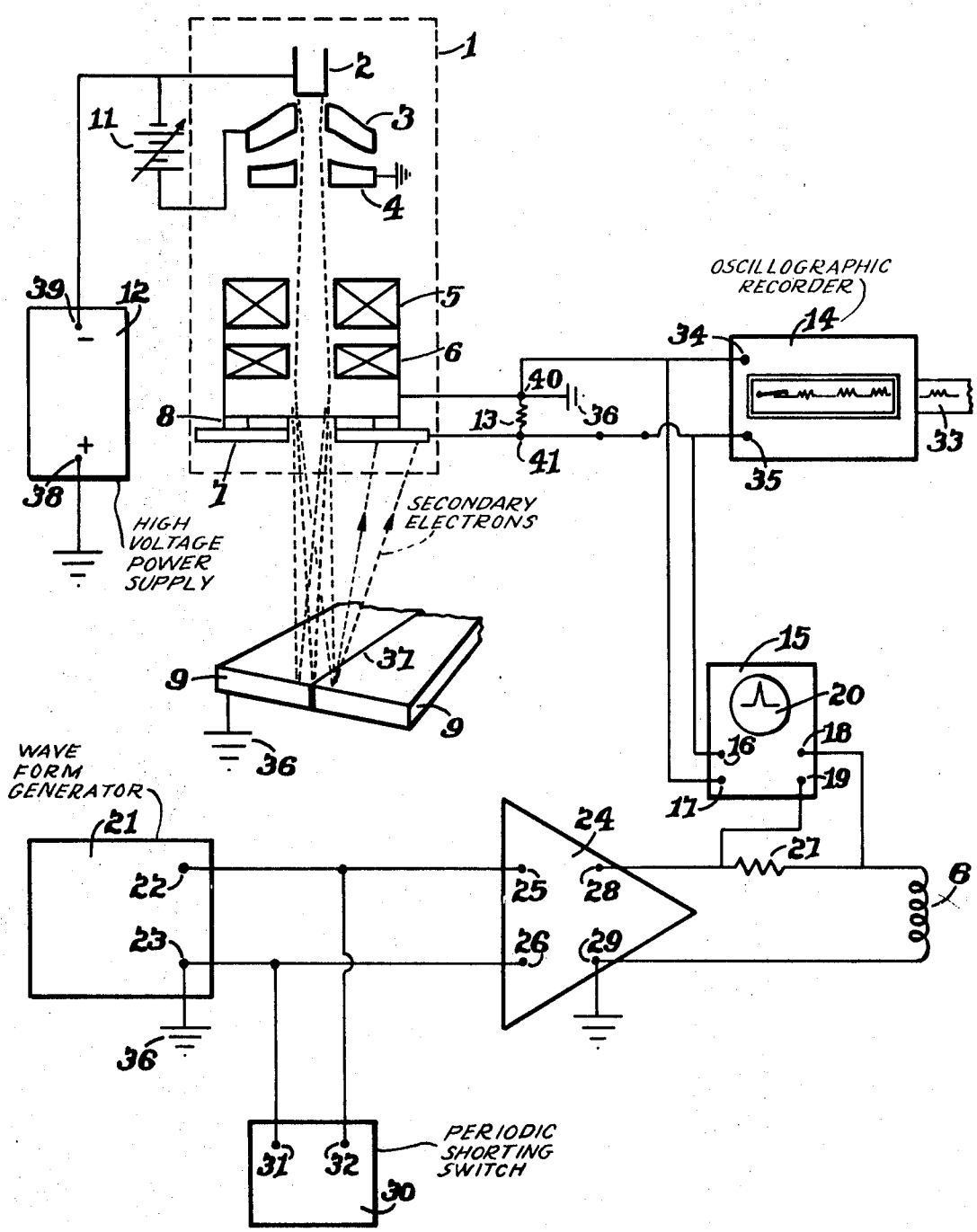
FIG. 1 is a schematic diagram showing the interconnection between the various pieces of equipment embodying one form of apparatus for practicing the method of the invention.

FIG. 1 shows one combination of apparatus which may be utilized to practise the method of the invention. The electron gun 1 is shown schematically and comprises an electron emitter 2, a cathode electrode 3, and anode electrode 4, having an orifice at its center through which the beam can pass, an electromagnetic focusing coil 5, and electromagnetic deflection coils 6. A secondary electron pickup electrode 7 is mounted on insulators 8 to the lower face of the electron gun. Electrons emitted from the electron emitter are electrostatically focused by the cathode and anode electrodes, and pass through the hole in the focusing coil 5 where they are focused to the surface of the workpieces 9. Deflection coils 6 are utilized to deflect the beam either longitudinally to or transverse to the seam 37 between the workpieces 9. By passing suitable currents through the deflection coils 6, the beam may be swept across the seam by a motion that varies either sinusoidally or linearly by the use of a triangular sweep or by means of a circular sweep through the use of currents through the two sets of deflection coils acting at right angles to each other which vary according to the sine and cosine functions. A high-voltage power supply furnishes the accelerating potential to accelerate the electrons emitted by the electron emitter 2 which are directed toward the work through the holes at the center of the various elements of the gun as described above, and a bias supply 11 controls the intensity of the current delivered to the work. By varying the negative potential of the cathode electrode 3 with respect to the emitter 2, the current which reaches the work may be adjusted to any desired level during the seam-scanning operation. The electron beam, after striking the work, passes through the work and returns to the positive terminal 38 of the high-voltage power supply. The negative terminal of the high-voltage power supply is connected to the emitting electrode 2. When the high energy electrons in the beam 10 strike the surface of the workpiece, secondary electrons will be emitted from the work surface and will be picked up by the secondary electron pickup electrode 7. The production of secondary electrons will be at a maximum when the beam strikes the surface of the workpiece and will be a minimum when the beam is focused and well centered along the edges of the seam 37 adjoining the two workpieces 9.

An ancillary use for the method of this invention is for the determination of the minimum size of electron beam striking the surface of the work that is the best focusing condition and a means of aligning the beam over the entire thickness and length of the joint.

Figure 3:
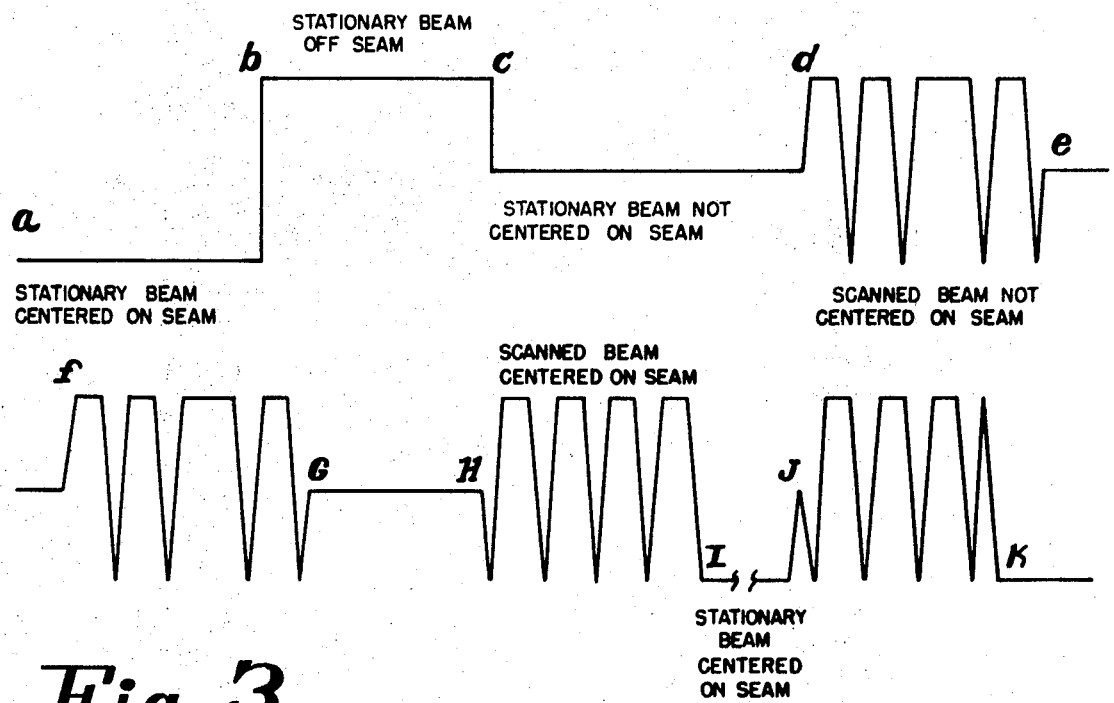
FIG. 3 shows the various patterns that will be produced on the recording of a recording oscillograph for different positions of the electron beam with respect to the seam to be welded.

The secondary electron current picked up by the electrode 7 passes through resistor 13 and returns to ground 36 producing a voltage drop across the terminals 40 and 41 of resistor 13. The voltage drop appearing across resistor 13 will be proportional to the secondary electron current picked up by the electrode 7. This voltage may be fed to either the terminals 34, 35 of recording oscillograph 14, or to the vertical deflection terminals 16 and 17 of recording oscilloscope 15. A permanent recording which indicates the variations in current passing through resistor 13 which is, of course, proportional to the variations in secondary emission depending upon whether the electron beam is striking the solid surface of the metal or the seam between the two plates, will be made when the recording paper is caused to move under the recording pen of the oscillograph. If the beam is oscillated transversely to the seam by passing a suitable sweep frequency current through the deflection coils 6 a recording will be made which will indicate the position of the beam with respect to the seam with respect to time, as is shown in FIG. 3. The deflection coils 6 may be energized from the terminals 28 and 29 of current amplifier 24 through a resistor 27. The input terminals 25 and 26 of current amplifier 24 are fed from output terminals 22 and 23 of signal or waveform generator 21. The signal generator is capable of producing currents which vary in a sinusoidal or square or triangular wave motion periodically over a wide range of frequencies. By adjustments of the frequency and waveform of the output of the signal generator and applying an amplified version of this signal to deflection coils 6, the electron beam 10 may be caused to sweep across the seam in a predetermined manner. The current through the deflection coils passing through the resistor 27 generates a voltage across resistor 27 which is fed to the horizontal sweep terminals 18 and 19 of the oscilloscope 15. The face of the cathode-ray oscilloscope will then display a pattern corresponding to the changes of the secondary emission with respect to time as the beam sweeps back and forth across the seam. If the current through the deflection coils is arrested, the beam will assume its rest position and a spot will appear upon the face of the cathode-ray oscilloscope which will represent by its horizontal coordinate the rest position of the beam in the horizontal direction and the rest position of the beam and by its vertical coordinate the amplitude of secondary electron emission from the at rest or undeflected point of impingement of the electron beam upon the work which is collected by plate 7. Through the use of periodic shorting switch 30 connecting the shorting terminals 31 and 32 across the output of the signal generator, the current through the deflection coil may be arrested periodically for a predetermined period of time so that a bright spot indicating the rest position of the beam will appear on the cathode-ray oscilloscope screen. The periodic shorting switch may be adjusted so that the open and closed periods may be varied. During the open or nonshorting time a pattern such as 20 will be displayed on the screen. During the closed or shorting periods the marker spots will be displayed on the screen. Because of the persistence of vision the marker spot will be superimposed over the pattern indicating the variations in secondary emission as the beam sweeps the seam. By moving the work with respect to the electron beam, the position of the marker spot with respect to the pattern will be shifted. When the bright marker spot coincides with the peak of the pattern displayed on the screen, the beam will be centered over the seam during its rest position. The work may then be moved longitudinal to the seam and the pattern on the cathode-ray tube screen observed. Should the bright spot move from the peak it would indicate that the work is not lined up properly since the beam rest position at that point would not be centered over the seam. By calibrating the cathode-ray tube screen, the actual displacement of the electron beam from the seam may be measured.

Figure 2:
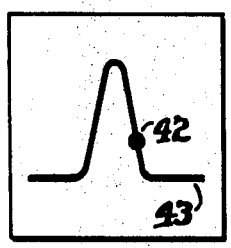
FIG. 2 illustrates the various patterns that may be seen on an oscilloscope which indicate different positions of the electron beam with respect to the seam to be welded.
Figure 2:
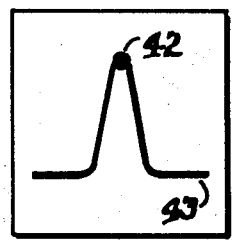
Figure 2:
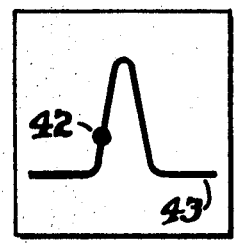

FIG. 2 shows the various patterns 43 which may be observed on the face of the cathode-ray oscilloscope resulting from different positions of the rest position of the beam with respect to the seam between the two pieces to be welded. FIG. 2a shows the pattern which results when the beam is displaced slightly to the right of the seam. FIG. 2b shows the pattern when the beam is centered over the seam, bright spot 42 being at the peak of the pattern 43. FIG. 2c shows the pattern that would result when the beam is displaced slightly off center and to the left of the seam between the two plates 9 to be welded.

FIG. 3 shows the pattern which would be made by the recording oscillograph under various conditions of beam placement with respect to the seam. The section between a and b on the trace would result from the stationary beam being centered on the seam. This would be the condition at which the minimum secondary emission would result and therefore the minimum voltage across 13. The section between b and c indicates the pattern that would result due to a stationary beam entirely off the seam. The section between points c and d would be under the condition of a stationary beam not centered properly on the seam, either to the left or to the right of the seam. The section between d and e would be recorded as shown when the beam is swept across the seam but when the rest position of the beam is not centered on the seam. e to f would be the pattern with the beam at rest but not centered on the seam. The pattern f to G again indicates the beam not centered on the seam. The peak patterns appear in pairs, the first peak being that formed when the beam is swept from left to right across the seam, the second peak of the pair being formed when the beam sweeps from right to left across the seam. As the two peaks from each pair become closer and closer together, it indicates that the beam is more and more off center from the seam. The pattern between G and H is again the stationary beam with the beam off center from the seam. H and K indicates a pattern resulting from the beam scanning the seam with the beam well centered on the seam. The peaks under this condition are equidistant from each other. The section of the pattern between I and J shows the recording that would be produced at the time that the periodic shorting switch is short circuiting the output voltage of the signal generator.

Figure 4:
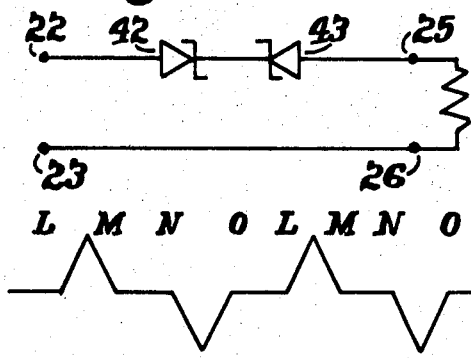
FIG. 4 illustrates a circuit which may be used to automatically bring the beam to its undeflected or at rest position.

FIG. 4 is a circuit by which the beam may be brought to its at rest or undeflected position periodically for relatively short periods of time and its position displayed on the oscilloscope screen or on a recording oscillograph, which does not require the use of a periodic shorting switch. To use this circuit, the shorting switch 30 is removed from the system, and the wire connecting terminal 22 to terminal 25 is removed and replaced by the circuit shown in FIG. 4 a. Zener diodes 42 and 43 are connected in opposition in series between terminals 22 of the signal generator and terminal 25 of the current amplifier. Current can flow on this line only after the breakdown voltage of the zener diode is reached in either direction. The triangular sweep generated by the signal generator will therefore be modified to the form shown in FIG. 4b. The beam thus caused to move in a linear fashion to sweep and scan the seam area during the period L to M and N to O, and the beam being in its rest position during periods M to W. During the M to W periods the oscilloscope will indicate the rest position of the beam with respect to the pattern of secondary electron current.

Although sinusoidal and triangular waveforms have been mentioned as being applicable to the method, other patterns may be utilized in order to obtain other useful information from the resulting pattern on the oscilloscope or the recording oscillograph. For example, a circular sweep of the beam could be utilized to give the sense of change of direction of the seam at the point being swept, or the man of the art could devise a discriminator circuit and servo operator which could automatically position the work with respect to the rest position of the beam so that the beam is well centered on the seam as the beam is moved along the seam as it would be in effecting a welding operation. The invention is not to be limited to, or by details of construction of the particular embodiment thereof illustrated by the drawings, as various other forms of the device will, of course, be apparent to those skilled in the art without departing from the spirit of the invention or the scope of the claims.

1. A method of determining the position of an electron beam with respect to the seam between two adjoining workpieces, comprising the steps of directing the said beam towards the seam between the adjoining workpieces, oscillating the beam across the seam and workpieces to cause the emanation of secondary electrons from the said workpieces, causing the beam to rest periodically at its undeflected position, collecting secondary electrons thus produced, passing the said secondary electrons through a resistor so as to generate a voltage proportional to the instantaneous value of the secondary electrons collected, applying the generated voltage to one set of deflection plates of a cathode-ray oscilloscope having at least two sets of deflection plates at right angles to each other, applying a voltage which is in synchronism with said oscillating beam to the second set of deflection plates of the said cathode-ray oscilloscope and displaying the resulting waveform on the screen of the said oscilloscope.

2. A method in accordance with claim 1 in which the time during which the beam is caused to rest periodically is adjustable.

3. A method in accordance with claim 2 in which the motion of the oscillating beam is periodically arrested during each period of oscillation.

4. In an electron beam apparatus having means for generating, accelerating, and focusing a beam of electrons upon adjoining workpieces, additional means for periodically deflecting the said beam along a path which crosses the seam between the said workpieces, means for periodically maintaining the beam at its undeflected position for a preset length of time, means for collecting secondary electrons resulting from the impingement of said beam upon said workpieces, means for conducting the said electrons so as to cause a flow of current, and oscillograph means for displaying the analog of the instantaneous values of the said secondary electron current.

5. Apparatus as in claim 4 in which the oscillograph means is of the cathode-ray type having means for deflection of the cathode ray along each of two mutually perpendicular axes, means by which the deflection along one axis is kept in synchronism with the motion of the aforementioned beam of electrons and means by which the deflection along the second axis is made proportional to the instantaneous value of the secondary electron current.

6. Apparatus as in claim 4 in which the said means for periodically maintaining the generated voltage at zero comprises switch means connected across the output terminals of the aforementioned signal generator, means for closing the said switch means periodically for a preset interval of time and means for varying the frequency of closure of the said switch means.

7. Apparatus as in claim 4 in which the means for periodically deflecting the beam is a signal generator having output terminals across which a periodic wave voltage appears, means for amplifying the said voltage and means for periodically maintaining the generated voltage at zero for a preset length of time.

8. Apparatus as in claim 7 in which the means for periodically maintaining the voltage of the signal generator at zero comprises a pair of zener diodes, in inverse relationship, connected in series between one of the output terminals of the signal generator and one of the input terminals of the aforementioned amplifier means.

9. An apparatus for determining the position of an electron beam with respect to the seam between two adjoining workpieces, said apparatus comprising means for generating, accelerating an focusing an electron beam upon workpieces, means for oscillating the beam upon the said workpieces along a predetermined path which crosses the said seam, means for causing the beam to rest periodically at its undeflected position, means for detecting secondary and reflected electrons which emanate from the point of impingement of the beam upon the work, including means for conducting the said secondary electrons so as to cause a current flow and means for generating a voltage proportional to the instantaneous value of the said secondary electron current, oscillograph means for displaying the instantaneous value of the said secondary electron current, and means for causing a bright marker spot to be displayed on the screen of the said oscillograph means, the said bright marker spot indicating the undeflected position of the beam with respect to the pattern of secondary emission displayed upon the screen of the oscillograph.